Inventor
Stanley Howard Edge
By [signature]
Attorneys

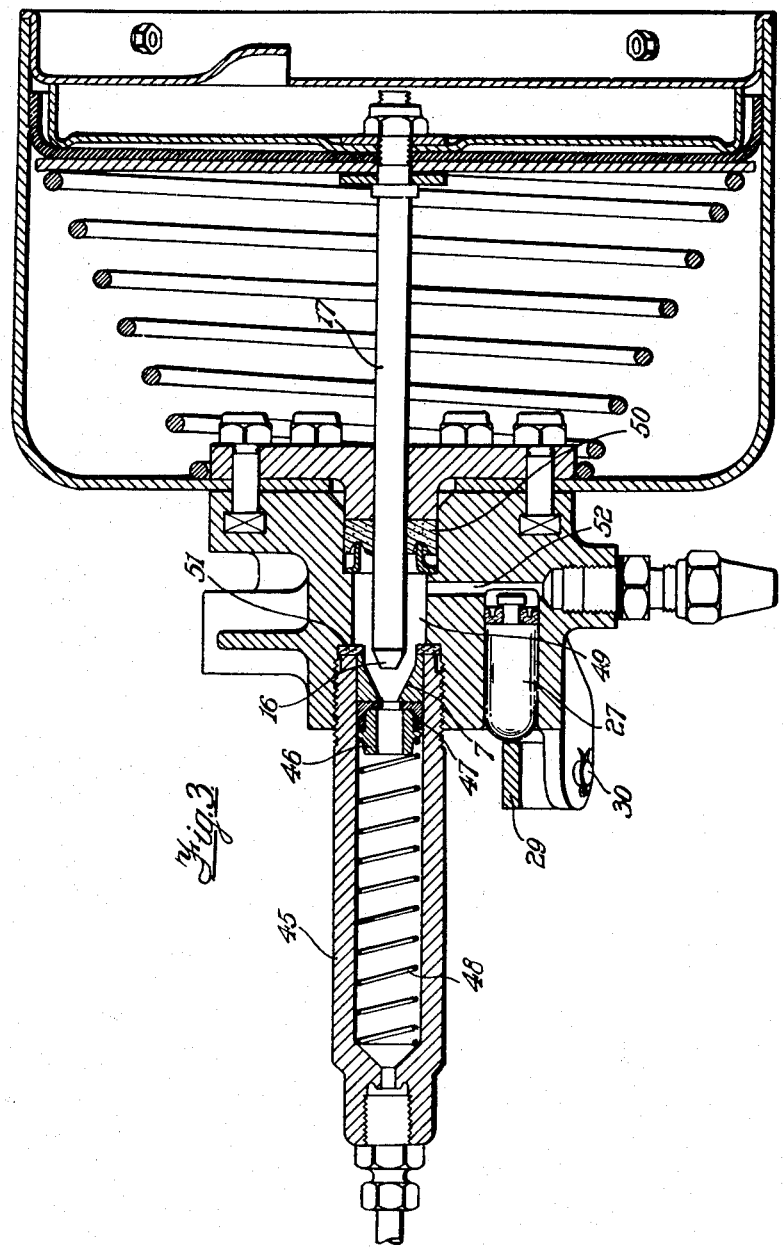

Patented Jan. 5, 1954

2,664,707

UNITED STATES PATENT OFFICE 2,664,707

SERVO ASSISTED OPERATING MECHANISM

Stanley Howard Edge, Lincoln, England, assignor to Clayton Dewandre Company Limited, Lincoln, England Application August 15, 1950, Serial No. 179,520

1 Claim. (Cl. 60—54.5)

This invention relates to servo-assisted operating mechanism and has more particular reference to mechanism of the kind employed for actuating the brakes of an automobile vehicle, the object of the invention being to provide an improved construction or arrangement capable of installation as a self-contained unit and designed for boosting a hydraulic transmission system while enabling emergency operation of the hydraulic system to be effected in the event of failure of the source of power.

According to the invention a servo-assisted operating mechanism includes a hydraulic transmission system between a pedal or like actuator and an output cylinder or cylinders, a hydraulic cylinder forming part of said transmission system, and a mechanical transmission arrangement operated by increase of pressure in the hydraulic cylinder to release a vacuum servo device for operation to reinforce or boost the impulse transmitted through the hydraulic system to a degree proportional to the pressure exerted on the actuator.

According to one form of the invention a servo assisted brake operating mechanism comprises hydraulic impulse transmission means between a master cylinder and a brake applying cylinder or cylinders, a mechanical transmission arrangement operated by pressure transmitted from the master cylinder to open a vacuum valve to operate a vacuum cylinder, means operated by said vacuum cylinder to actuate a valve member to shut off the hydraulic transmission from the master cylinder and thereafter transmit movement from the vacuum cylinder through the hydraulic system to the brake cylinder or cylinders to a degree proportional to the pressure applied to the pedal or other actuator.

Reference will now be made to the accompanying drawings which show a servo-assisted mechanism for operating vehicle brakes and in which:

Fig. 3 is a sectional view of an alternative arrangement.

Figure 1:
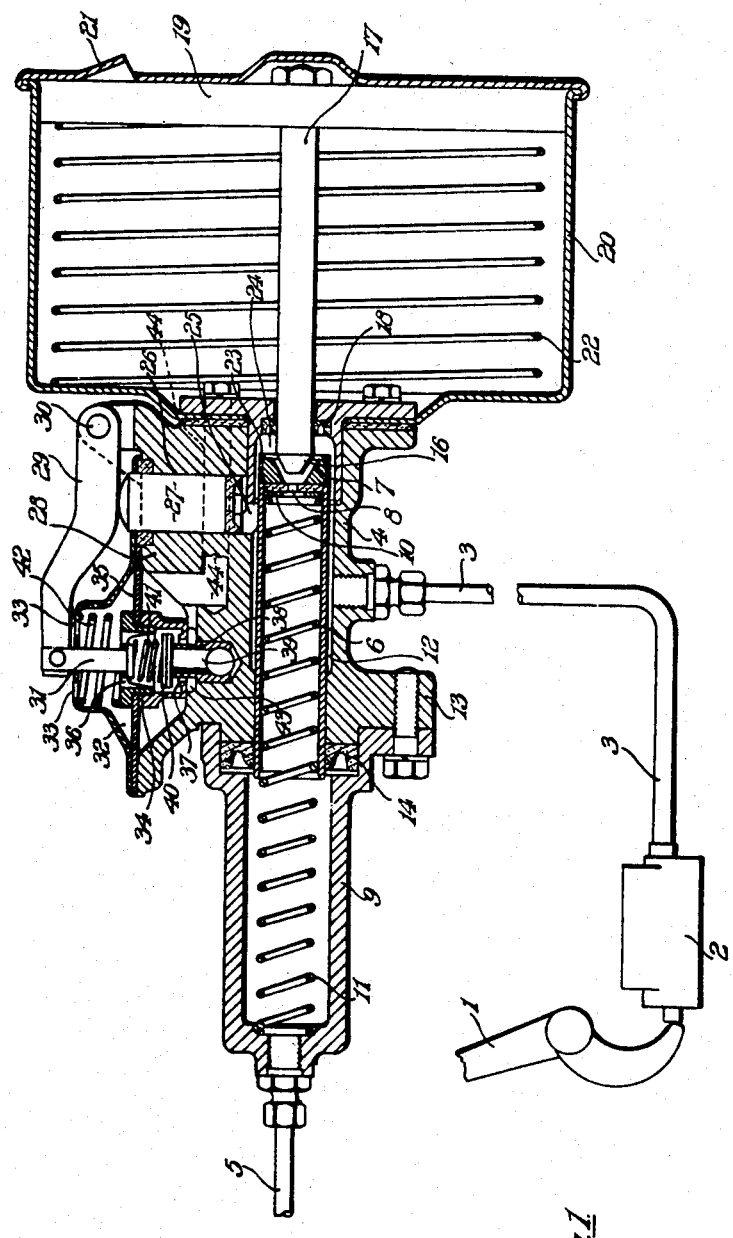
Fig. 1 is a diagrammatic view showing the inoperative position.

In the arrangement illustrated a servo-assisted mechanism applicable to the operation of vehicle brakes includes an actuating pedal 1 arranged to operate a hydraulic master cylinder 2 of known construction which is connected by a conduit 3 to an operating cylinder 4 in turn connected by a conduit 5 to separate cylinders arranged to actuate the vehicle brakes. Within the operating cylinder 4 is slidably mounted a cylindrical valved piston 6 having at one end a coned valve seating 7 surrounding an opening 8 and completely open at its opposite end. The valved piston 6 is movable, as hereinafter described, into an extension 9 of the cylinder 4. Between the outer end of the extension 9 and the inner surface of the end 10 of the valve member is disposed a helical spring 11 which opposes operative movement of the valved piston and serves to return it to normal position after operation.

The cylindrical valved piston 6 is surrounded through the major portion of its length by an annular space 12 which is always in free communication with the master cylinder 2. The valved piston 6 is slidable in an end portion 13 of the cylinder 4 and adjacent this end portion is disposed a sealing member 14, in this instance a cup washer disposed in an annular chamber 15 to prevent displacement during operation of the valved piston, the said sealing member 14 serving to cut off communication between the annular space 12 and the conduit 5 leading to the output cylinders during operation of the mechanism.

Disposed in axial alignment with the valved piston 6 is a co-operating tapered valve member 16 adapted to enter the coned seating 7 and formed at the end of a piston rod 17 passing through a sealed gland 18 and carrying the piston 19 of a vacuum cylinder 20. This cylinder has an atmospheric port 21 at the end remote from the valve member 16 and a spring 22 to return the piston 19 to the position shown in Fig. 1 after operation.

At the end of the operating cylinder 4 adjacent the valve members 7 and 16 is an annular shoulder 23 against which the end of the valved piston 6 abuts in its rest position and between this shoulder and the gland 18 is a cylindrical chamber 24 to enable the hydraulic fluid to act on the rear of the valved piston 6 at all times. Adjacent this point the annular space 12 communicates through a port 25 with a cylinder 26 containing a plunger 27 whose head extends beyond the casing 28 wherein the operating cylinder 4 is formed and engages the edge of a lever 29 movable about a pivot 30 carried by the said casing. The opposite end of the lever 29 is connected to a stem 31 depending into a chamber 32 formed in the casing 28 and provided with atmospheric ports 33. The stem 31 carries at its lower end a cylindrical casing 34 whose exterior is connected to the walls of the chamber 32 by a flexible diaphragm 35. The top of the casing 34 is provided with ports 36 and its base 37 has a central aperture which passes freely around a valve seating 38 within which is a passage 39 in permanent communication with a source of vacuum. Within the casing 34 is a disc valve member 40 normally held onto the seating 38 by a spring 41 whose upper end bears against the top of the casing 34 and which serves to close the vacuum passage 39. The casing 34 is normally held in the position shown in Fig. 1 by a spring 42 whose upper end bears against the top of the chamber 32 whose base communicates by an annular passage 43 and a passage 44 with the interior of the vacuum cylinder 20. In the rest position, shown in Fig. 1, therefore, the interior of the cylinder 20 is in communication with atmosphere through passage 43, casing 34 and chamber 32 the interiors of which are open to atmosphere through the ports 33.

Figure 2:
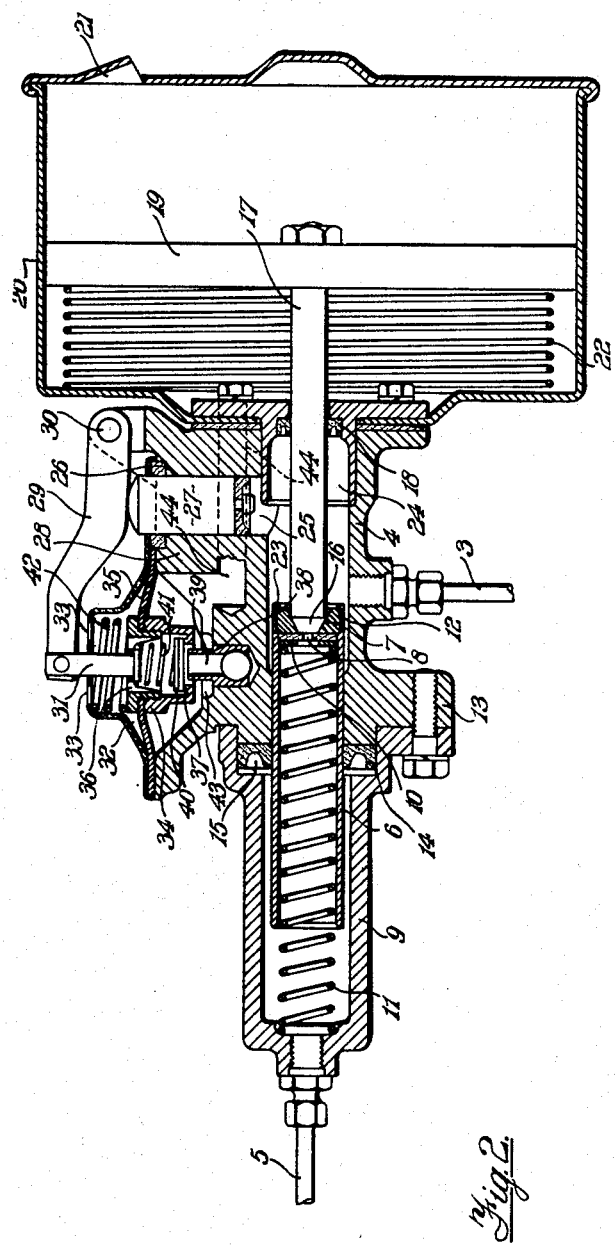
Fig. 2 is a view similar to Fig. 1 showing an operative position.

The operation of the arrangement above described is as follows:

When effort is applied to the brake pedal 1 the hydraulic master cylinder 2 is operated to create pressure in the operating cylinder 4 which pressure causes movement of the plunger 27 to rock the lever 29 in an upward direction around its pivot 30 and lift the cylindrical casing 34 to the position shown in Fig. 2. These operations first close communication between the cylinder 20 and atmosphere as the base 37 of casing 34 engages the underside of the disc valve member 40 and thereafter lift the disc valve member to place the vacuum passage 39 in communication with the cylinder 20 by way of passages 43 and 44.

The piston 19 is accordingly moved towards the left (see Fig. 2) to cause the valve member 16 to engage in the valve seating 7, close the end of the cylindrical valved member 6 which by continued movement of the piston 19 is pushed outwards against the resistance of the spring 11 to assist the hydraulic transmission of effort through the conduit 5 to the brake applying cylinders. The degree of vacuum exerted in the cylinder 20 is proportional to the pressure applied to the pedal 1 up to a predetermined point, when full vacuum is exerted. This is achieved by proportioning the flexible diaphragm 35 in relation to the diameter of the hydraulic plunger 27 and the leverage between the two exerted through the pivoted lever 29. After the initial movement has lifted the plunger 27 and stem 31, the opening of the disc valve member 40 places the whole of the interior of the chamber 32 below the diaphragm 35 under vacuum which, in conjunction with the springs 42 and 41, tends to withdraw the diaphragm from the distened position shown in Fig. 2 to that shown in Fig. 1 and simultaneously to seat the disc valve member 40. In consequence a sustained pedal effort is necessary to maintain the cylinder 20 under vacuum and an increasing effort at the pedal to obtain a proportional increase in the effort transmitted to the brake applying cylinders to obtain full braking of the vehicle.

In the alternative construction shown in Fig. 3, the extension 9 and valved piston 6 of the arrangement shown in Figs. 1 and 2 are replaced by a cylinder 45 into which is fitted a piston 46 provided with a cup washer 47. The inner end of the piston 46 is fixed into the casing 28 and terminates in the valve seating 7 adapted to be engaged as before by the valve member 16 which, when actuated, pushes the piston 46 outwards in the cylinder 45 against the resistance of a spring 48. The chamber 12 is dispensed with and the connection from the master cylinder 2 is to a chamber 49 into which the piston rod 17 extends through a gland 50. The opposite end of the chamber is sealed by a packing element 51 disposed adjacent the inner end of the cylinder 45. From the chamber 49 a passage 52 leads to the cylinder 26 wherein a plunger 27 is arranged as in Figs. 1 and 2 to move a lever 29 about a pivot 30 to actuate the diaphragm valve arrangement omitted from Fig. 3 as being outside the plane in which the section is taken.

The arrangements according to the invention possess the advantage that failure of the vacuum source does not affect the hydraulic system as the hydraulic fluid is contained in a sealed circuit which alone is capable of transmitting impulses through the column of liquid in conduit 3, cylinder 4, extension 9 and conduit 5 to the brake applying cylinders when the pedal 1 is actuated.

The invention possesses the further advantage in that the operating cylinder 4, the vacuum valve mechanism carried in and upon the casing 28, and the vacuum cylinder 20 together form a self-contained unit capable of installation at any convenient point on a vehicle chassis and does not require any mechanical assistance from the chassis apart from mere support.

I claim:

A servo-assisted operating mechanism, comprising a hydraulic cylinder having means at its forward end for connecting it to at least one output cylinder, a valve casing secured to the rear end of the hydraulic cylinder and having a cylindrical chamber therein at the rear end of the hydraulic cylinder, a vacuum cylinder secured at one end to the valve casing in axial alignment with the hydraulic cylinder, a manually operable master cylinder communicating with said cylindrical chamber, a valved piston movably mounted within the hydraulic cylinder and having a central opening therein through which the master cylinder normally communicates with the output cylinder and a coned valve seat surrounding said opening, a spring opposing forward movement of said valved piston, a piston disposed within the vacuum cylinder and having a piston rod projecting into said cylindrical chamber, said piston rod having a coned end surface and being adapted, upon operation of said piston, to be advanced into the hydraulic cylinder by its initial movement to engage its coned end surface with the coned valve seat of the valved piston to close said opening therein and by its further advance to impart movement to the valved piston and thereby boost the pressure of fluid in the hydraulic cylinder, a valve chamber in said valve casing having a first passage for communication between said valve chamber and a source of vacuum and having a second passage for communication between said valve chamber and the vacuum cylinder, a spring-loaded disc valve member arranged normally to close said first passage, a lever pivotally mounted upon said valve casing externally thereof and having a free end, a flexible diaphragm peripherally secured to the walls of said valve chamber and exposed on one side to atmosphere, a cylindrical member secured centrally to said diaphragm and connected to the free end of said lever and formed with ports through which said second passage and the vacuum cylinder normally communicate with atmosphere, said valve casing having a cylindrical bore which extends inwardly from the exterior thereof and communicates at its inner end with the master cylinder and said cylindrical chamber at the rear of the valved piston, a plunger slidably mounted in said cylindrical bore, said plunger projecting outwardly beyond the outer end of said bore to bear against said lever intermediately of the ends thereof and being subjected at its inner end to the pressure of fluid in the master cylinder, and being operable, upon an increase in said fluid pressure, to actuate said lever to move said cylindrical member initially into engagement with the disc valve member to cut off the vacuum cylinder from atmosphere and subsequently by further movement of said cylindrical member to unseat said disc valve member and thereby place the vacuum cylinder in communication with the source of vacuum to effect operation of the piston therein.

STANLEY HOWARD EDGE.

References Cited in the file of this patent

UNITED STATES PATENTS

| Number | Name | Date |
|---|---|---|
| 2,393,524 | Fant | Jan. 22, 1946 |
| 2,446,884 | Price | Aug. 10, 1948 |
| 2,526,236 | Ingres | Oct. 17, 1950 |
| 2,536,461 | Price | Jan. 2, 1951 |
| 2,588,048 | Rockwell | Mar. 4, 1952 |